April 29, 1952 K. L. BURGENER 2,594,726
SIGNAL CONTROL CIRCUIT FOR TELEPHONE SWITCHING EQUIPMENT
Original Filed June 28, 1945
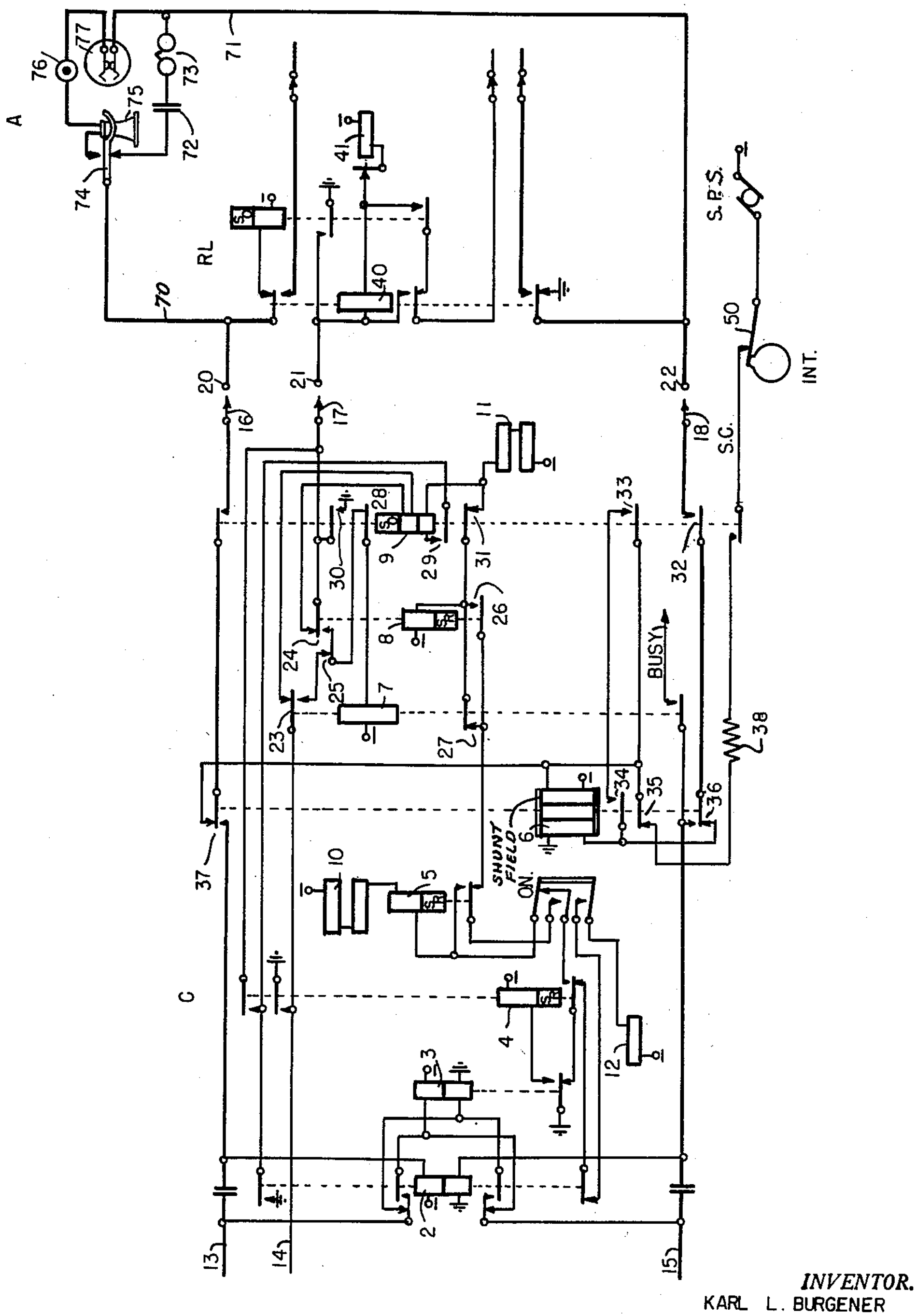
INVENTOR.
KARL L. BURGENER
BY
ATTORNEY Patented Apr. 29, 1952

2,594,726

UNITED STATES PATENT OFFICE 2,594,726

SIGNAL CONTROL CIRCUIT FOR TELEPHONE SWITCHING EQUIPMENT

Karl L. Burgener, Villa Park, Ill., assignor to Automatic Electric Laboratories, Inc., Chicago, Ill., a corporation of Delaware Original application June 28, 1945, Serial No. 601,966. Divided and this application September 24, 1947, Serial No. 775,885

11 Claims. (Cl. 179—18)

This invention relates to telephone or like systems in general, and more particularly to improved means for disconnecting signalling current from a called line under control of the line, in systems using automatic signalling.

The present application is a division of my copending application Serial No. 601,966, filed June 28, 1945, now Patent No. 2,504,641, granted April 18, 1950, entitled Signalling Systems.

It is an object of this invention to provide improved means for controlling the signalling in a telephone or like system.

An object of this invention is to provide an improved signalling means for systems of this character in which the signal control relay cannot be operated by current flowing over the signalling power lead and the called line, but can be operated by current flowing over the called line from a power source connected directly to the signal control relay.

Another object of the invention is to utilize a magnetic shunt in a signal control relay.

A further object of the invention is to provide a signal control relay that will operate only when the voltage of the operating power source is higher than the positive or negative voltage of the signalling power source.

Another object of the invention is to provide an improved signal control circuit in which the possibility of false operation of the signal control relay is reduced to a minimum.

Prior to this invention double wound, slow acting relays have been widely used for quick disconnect of the signalling current under control of the called line. Signalling current, on which a direct current source, usually the exchange battery, is superimposed, is supplied to the called line in series with a signalling winding of the relay. The slow acting feature of the relay causes counter electro motive forces to build up which nullify the effect of magnetic fields building up in the relay from the signalling current flowing through the signalling winding. The frequency, the magnitude of the voltage, and the wave form of the signalling current are important factors in the signalling range that can be provided with a signal control relay of this type. The slow acting feature of the relay is effective only while magnetic fields in the relay are building up rapidly which is only for a small fraction of a second. The power supplied over the signalling lead usually operates a single contact when the called line answers which closes a local circuit to an operating winding of the relay to cause complete operation of the relay and the disconnection of the signalling current from the line. The field of the operating winding and the field of the signalling winding must be in the same direction to insure complete operation of the signal control relay, and the relay will be most readily operated when the signalling voltage is at its highest point and in the same direction as the direct current voltage superimposed thereon.

The power for operating the control contact responsive to the called line answering is supplied over the signalling power lead. When the amount of signalling current flowing over the line is relatively high there is a tendency for the signal control relay to operate during signalling prior to the called line answering. This limits the number of signalling devices that can be associated with a line, the characteristics of the signalling devices, and the general line characteristics that can successfully be employed in systems using automatic signalling with a winding of the signal control relay incorporated in the signalling circuit to provide for disconnecting the signalling current under control of the called line during both the signalling and the silent periods.

It is the aim of the present invention to eliminate this tendency toward false operation so that automatic signalling with disconnection of the signalling current under control of the called line can be used on lines with less limited characteristics and so that a larger number of signalling devices, the characteristics of which need not be closely controlled, can be used on the lines.

To accomplish this a signal control circuit is provided in the connecting link in which a double wound shunt field relay such as described in Patent 1,544,300 granted June 30, 1925 to Charles J. Erickson, which may be seen for a detailed description of the relay, is used as a signal control relay. When a connecting link is conditioned to signal a called line the signal control relay is connected differentially to a signalling power source of variable potential in series with a suitable resistor, one winding of the relay being included in the circuit for signalling current to the called line, the other winding being in parallel with the signalling circuit for the line.

The armature of the shunt field relay will not operate when only one of its windings is energized nor will it operate when both of its windings are energized if the magnetic fields develop in its windings are in opposite directions. This result is obtained from the magnetic circuit in the relay which provides a low reluctance path for magnetic flux developed when only one winding of the relay is energized or when the two windings of the relay are energized in opposite directions, thus in effect shunting the operating armature of the relay. A balance between the strength of the magnetic fields developed in the windings is not necessary to prevent operation of the armature. As the windings of the relay are connected differentially in respect to the signalling current lead the fields developed in the windings will be in opposite directions and thus current flowing over the signalling current lead will not operate the signal control relay.

An operating power source, one terminal of which is connected to ground, is connected to the windings of the signal control relay, the grounded terminal being connected to the winding which is in series with the line signalling circuit and the other terminal being connected to the winding which is in multiple with the line signalling circuit. The operating power source is also superimposed on the signalling power source in the well known manner. The windings of the signal control relay are connected to the opposite sides of the line so that when the line characteristics are changed responsive to the called line answering, and when the voltage of the signalling power source reaches a favorable point in relation to the voltage of the operating power source current from the operating power source will flow over the line thru the windings of the signal control relay in series. The magnetic fields developed in the windings of the signal control relay by this current will be in the same direction and will operate the armature of the relay. The armature, in operating, closes a local circuit through the two windings of the relay in series causing the signal control relay to complete its operation and disconnect itself and the signal power source from the line.

A feature of this invention is that the signal control relay operates, and the signalling power source is disconnected from the line, when the voltage of the signalling power source is low in relation to the voltage of the operating power source.

Another feature of the invention is that when interrupted signalling is used a power source does not have to be connected to the signalling power lead during the silent period.

Another feature of the invention is that current flowing over the line from the signal power lead will not cause false operation of the signal control relay.

The objects and features of the invention will be understood better from the following detailed description, taken in conjunction with the accompanying drawing which forms a part thereof, showing the invention as applied to the well known Strowger step by step system. It will be understood, however, that this arrangement is described by way of example only, that various modifications may be made in the circuit details by those skilled in the art without departing from the spirit of the invention, and that this invention can be applied to other systems.

Referring to the drawing, there is shown by means of the usual circuit diagrams a connector switch C, employing the new and improved signalling control feature, a rotary line switch RL, a subscribers substation A, an interrupter INT, and a source of signalling power S. P. S.

The connector switch C is of the well known Strowger vertical and rotary type such as described in Patent 2,040,153 granted May 12, 1936 to Seth Peterson. The connector C has access to automatic subscribers lines such as the lines of substation A. In the present case connector C is accessible to calling subscribers such as subscriber A, by way of their individual line switches such as RL.

The line switch RL is of the well known rotary type in which the wipers have no normal position and which have access to connector switches such as connector C.

The substation A consists of a signalling device, a calling device and the usual instrumentalities to enable the subscriber to carry on conversation. The line of substation A terminates in the line switch RL and connector bank contacts in connectors such as connector C.

The interrupter INT is of the well known motor driven type and is connected over the S. C. conductor to connectors such as connector C. The interrupter alternately connects and disconnects the signalling power source to the S. C. conductor.

The signalling power source S. P. S. is an alternating current generator of the well known type with the operating power source superimposed upon it and is alternately connected to and disconnected from connectors such as connector C through the interrupter INT.

The normal operation of connector C is well known, but will be briefly described nevertheless, preliminary to explaining the operation of the signalling control feature.

Assuming that connector C has been seized by a line switch, the calling line will be extended to trunk conductors 13 and 15, which results in the energization of line relay 3, followed by the energization of release relay 4. The latter grounds the release trunk conductor 14 so as to provide a holding circuit for the calling lineswitch.

The calling party now dials the tens digit in the number, which causes line relay 3 to deenergize momentarily a number of times, sending impulses to the vertical magnet 10. This steps the wipers 16, 17, and 18 until they stand opposite the level in which the called line is terminated. The slow relay 5 is in series with the vertical magnet and cooperates with the off normal springs ON to transfer the impulse circuit to the rotary magnet 11 at the end of the vertical operation.

The calling subscriber may now dial the last or units digit of the called number. The line relay operates as before, but now sends a series of impulses to the rotary magnet 11. Accordingly, the wipers 16, 17, and 18 are rotated step by step until they come to rest on the called line terminals. It will be assumed that the called line is the line of station A and that the wipers are positioned on contacts 20, 21 and 22.

If the called line is idle when connected with, a circuit is completed for energizing switching relay 9, extending from the grounded conductor 14, by way of contacts of test relay 7, the upper winding of relay 9, contacts of relay 8, test wiper 17, test contact 21, the cut-off relay 40 of lineswitch RL, and the stepping magnet 41 of the said lineswitch to battery. Relay 9 pulls up in series with the cut-off relay, which latter performs the usual well known functions. Relay 9 is slightly slow to operate, to give time for the operation of the cut-off relay. As the armature of relay 9 is attracted, the pair of springs represented by armature 29 and its working contact are closed first, thus completing an energizing circuit for the lower locking winding. The two windings then cooperate in fully operating the relay and thus all springs of the relay are actuated. Armature 30 grounds the test wiper 17, armature 31 opens the rotary magnet circuit, the upper armature and armature 32 connect up the line wipers 16 and 18, armature 33 prepares a local circuit for relay 6, and the lower armature connects the signalling power source S. P. S., through armature 50, the S. C. lead, resistor 38, and armature 35 of relay 6 to the right winding of relay 6 and to line conductor 70, through armature 37, upper armature of relay 9, line wiper 16, and bank contact 20. Signalling current is now projected over the line and flows through the condenser 72, the bell 73, line conductor 71, bank contact 22, wiper 18, armature 32, armature 36 and the left winding of relay 6 to ground to signal the called substation.

The upper terminal of the left winding of the relay 6 is connected to an operating power source, which in this case is the operating battery for the switching equipment and has the positive terminal grounded. The operating power source is superimposed on the signalling power source in the well known manner, thus a circuit for signalling current is completed to the right winding of relay 6 through the negative battery terminal, the signalling power source, armature 50, the S. C. lead, lower armature of relay 9, resistor 38, and armature 35. Signalling current also flows through the left winding of relay 6 in series with the line conductors over the circuit previously traced.

The relay 6 is a shunt field relay and its windings are connected differentially with respect to the signalling current. The armature of the relay 6 will not be operated because the fields developed in the windings at this time are in opposite directions.

When the receiver 75 is removed from the switch hook 74 at the called telephone the line conductor 70 is transferred from the condenser 72 to the receiver 75 and a circuit for the operating power source is completed through the right winding of relay 6, armature 37, upper armature of relay 9, wiper 16, contact 20, line conductor 70, hook switch 74, receiver 75, transmitter 76, calling device 77, line conductor 71, contact 22, wiper 18, armature 32, armature 36, through the left winding of relay 6 to ground.

The voltage of the signalling power source, S. P. S. fluctuates rapidly between relatively high positive and negative values and passes through zero twice in each cycle. It is alternately connected to and disconnected from the connecting link circuits at interrupter springs 50.

If the receiver is removed from the switch hook while signalling current is being projected over the line, current from the operating power source connected to the right winding of the relay 6 will not flow over the line unless the voltage of the signalling power source is relatively low. When the voltage of the signalling power source is near zero, current from the operating power source flows through the right winding of the relay 6 over the line conductors through the left winding of relay 6 to ground over the circuit previously traced. The fields built up in the windings of the relay 6 by this current are in the same direction and the armature of the relay is attracted. The voltage of the signalling power source is low at this time hence the fields developed in the windings of the relay 6 by current from the signalling power source will be weak and will have little effect on the performance of the relay. As the armature of the relay 6 is attracted the pair of springs represented by armature 34 and its working contact are closed first, thus completing a local circuit for the two windings of the relay 6 from the operating power source through the right winding of relay 6, armature 33, armature 34, and the left winding of relay 6 to ground. The two windings then cooperate in fully operating the relay and thus all the springs of the relay are actuated. Armature 35 disconnects the signalling power source from the relay 6, armatures 36 and 37 disconnect the windings of relay 6 from the line conductors 71 and 70 and connect the line conductors to the windings of the relay 2 to complete the talking circuit.

If the receiver is removed from the switch hook during the silent period the signalling power source is disconnected at the interrupter springs 50 and the windings of the relay 6 are energized from the operating power source through the right winding of relay 6 and the line conductors 70 and 71 to ground through the left winding of relay 6 over the circuit previously traced. The relay 6 operates to disconnect itself and the S. P. S. lead from the line and to complete the talking circuit as described above.

The release of the connector is controlled by the release relay 4, which falls back if the line is opened for more than a very short interval, and closes a circuit for the release magnet 12. The magnet circuit is broken at the off normal springs when the switch shaft reaches normal position. The connector is of the release by last party type and therefore the releasing operation is delayed if the called party fails to hang up.

Having described my invention, what is considered to be new and is desired to be protected by Letters Patent will be set forth in the following claims.

What is claimed is:

1. In a telephone system, a link circuit including a signal control relay and a source of signalling current, a called line, means in said link circuit for completing a signalling circuit over the called line, said circuit including one winding of the signal control relay, and for connecting said source of signalling current to another winding of the signal control relay to energize the relay to varying degrees thereby, said signal control relay being inoperative when energized to the greatest degree by the signalling current, and means responsive to the closure of said line for operating said relay to disconnect the source of signalling current therefrom.

2. In a telephone system, a telephone line, a link circuit, a source of signalling current, a plural wound relay having a source of operating current connected thereto, means in the link circuit for completing a signalling circuit including the source of signalling current, the line, and one winding of the relay, means in said relay to prevent the operation thereof when energized over said signalling circuit, and means for completing another circuit including another winding of said relay, said operating power source, and said line for operating said relay in response to the closure of the line to disconnect the source of signalling current therefrom.

3. In a telephone system, line circuits having signals, a connecting link circuit for seizing a line, a relay having a pair of windings in said link, a source of operating current, a source of signalling current, means in the link circuit for completing a circuit from the source of signalling current to one winding of the relay, said circuit including one terminal of the source of operating current, and for completing a signalling circuit including said source of signalling current, the line circuit, and the other winding of the relay, and means for operating said relay from the source of operating current to disconnect the source of signalling current from the line, said relay being inoperative over the signalling circuit responsive to the closure of said line.

4. In a telephone system, a connecting link circuit including a relay having a closed magnetic circuit and a second magnetic circuit, a source of operating power connected to said relay, and a source of signalling power with said operating power superimposed thereon, a line circuit including a signalling device, means for interconnecting the relay, the signalling power source with the operating power source superimposed thereon, and the line circuit to operate said signalling device, said closed magnetic circuit effective to prevent the operation of said relay from said signalling power source with said operating power source superimposed thereon, said second magnetic circuit effective for operating said relay from the source of operating power connected thereto responsive to the closure of said line circuit.

5. In a telephone system, a line circuit including a signal, a link circuit including a relay having a closed magnetic circuit and a second magnetic circuit, a source of operating power, and a source of signalling power of variable potential with one terminal connected to a terminal of said operating power source, means for completing a circuit for signalling current over said line to operate said signal, said circuit including a winding of said relay, said signalling power source, and said operating power source, said closed magnetic circuit effective to prevent the operation of said relay over said circuit for signalling current, said second magnetic circuit effective for operating said relay from the source of operating power connected thereto responsive to the closure of said line circuit when the potential of the operating power source is greater than the potential of the signalling power source.

6. In a telephone system, a plurality of lines, a switch, a shunt field relay in said switch, a winding and a magnetic shunt in said relay, a source of varying signalling power and a main power source in said switch, means for operating said switch to seize one of said lines, and means for completing a signalling circuit to said one line from said source of varying signalling power, said signalling circuit including also said winding of said relay and said main power source in series, means for completing a main power circuit over said one line including said relay and said main power source, the magnetic shunt in said relay being effective to prevent the operation of the relay over said signalling circuit, and effective to prevent the operation of said relay over said main power circuit responsive to the completion of said main power circuit while the value of said signalling power is greater than the value of said main power.

7. In a telephone system, a line circuit having a signalling device thereon, a shunt field relay having two windings, a source of signalling current, means for completing a signalling circuit including said signalling device and one winding of said relay in series, and for completing a circuit for signalling current through the other winding of said relay in parallel with said signalling circuit, the magnetic shunt in said relay effective to prevent the operation thereof by said signalling current.

8. In a telephone system, a line, automatic switches, a signalling power source, a plural wound relay having an operating power source connected thereto, means including said automatic switches for connecting said signalling power source and at least one winding of said relay to said line, means in said relay for preventing the operation thereof from said signalling power source, and windings of said relay including said one winding energized from said operating power source in series with said line responsive to the closure of said line for operating said relay to disconnect the signalling power source therefrom.

9. In a telephone system, a plurality of lines, a shunt field relay, a winding on said relay, a source of signalling power alternating current, a main power source of direct current, means for extending a connection to one of said lines, means for completing an alternating current circuit from said source of signalling power to a line to which a connection is extended, said alternating current circuit including said winding of said relay and said main power source in series, means for completing a direct current circuit over said line to which a connection is extended, the magnetic shunt in said relay being effective to prevent the operation of the relay over said alternating current circuit, and effective to prevent the operation of the relay over said direct current circuit responsive to the completion of said direct current circuit while said alternating current value is greater than said direct current value.

10. In a telephone system, a line, a source of signalling current, a plural wound relay having a source of operating power connected thereto, means for extending a connection to said line and for completing a signalling circuit including the source of signalling current and the line and one winding of the relay, means in said relay to prevent the operation thereof when energized over said signalling circuit, and means for completing another circuit including another winding of said relay and said operating power source and said line for operating said relay to disconnect the source of signalling current therefrom.

11. In a telephone system, a plurality of lines, switching means for seizing one of said lines, a normally incomplete talking circuit in said switching means, a signalling circuit in said switching means, a shunt field relay having two windings, said windings connected in said signalling circuit differentially, means for operatng said relay under control of a seized one of said lines comprising a power source and a circuit including said line connecting said windings in such a direction that said windings have the same polarity, and means operated under control of said relay for completing said talking circuit and for disabling said signalling circuit.

KARL L. BURGENER.

REFERENCES CITED

The following references are of record in the file of this patent:

UNITED STATES PATENTS

| Number | Name | Date |
|---|---|---|
| 1,111,742 | Godfree | Sept. 29, 1914 |
| 1,675,312 | Wicks | June 26, 1928 |